US010876575B2

United States Patent
Homma et al.

(10) Patent No.: US 10,876,575 B2
(45) Date of Patent: Dec. 29, 2020

(54) MOTION GUIDE DEVICE

(71) Applicant: THK CO., LTD., Tokyo (JP)

(72) Inventors: Kazuto Homma, Tokyo (JP); Kenichi Hasebe, Tokyo (JP); Toshihisa Maeda, Tokyo (JP); Junichi Sakai, Tokyo (JP); Nobuyuki Maki, Tokyo (JP); Kaoru Hoshide, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/764,700

(22) PCT Filed: Sep. 9, 2016

(86) PCT No.: PCT/JP2016/076588
§ 371 (c)(1),
(2) Date: Mar. 29, 2018

(87) PCT Pub. No.: WO2017/061231
PCT Pub. Date: Apr. 13, 2017

(65) Prior Publication Data
US 2018/0283449 A1 Oct. 4, 2018

(30) Foreign Application Priority Data
Oct. 7, 2015 (JP) .................................. 2015-199636

(51) Int. Cl.
F16C 29/00 (2006.01)
F16C 29/04 (2006.01)
(Continued)

(52) U.S. Cl.
CPC .......... F16C 29/048 (2013.01); F16C 29/001 (2013.01); F16C 29/002 (2013.01);
(Continued)

(58) Field of Classification Search
CPC .... F16C 29/048; F16C 29/06; F16C 29/0602; F16C 29/0604; F16C 29/0609;
(Continued)

(56) References Cited

U.S. PATENT DOCUMENTS 2,929,661 A * 3/1960 Brown .................. F16C 29/005
384/45
3,008,774 A * 11/1961 Morris ..................... B23Q 1/40
310/90.5
(Continued)

FOREIGN PATENT DOCUMENTS

DE 9206715.8 U1 7/1992
DE 102010034929 * 2/2012
(Continued)

OTHER PUBLICATIONS

Machine Translation of DE 102010034929 (Year: 2012).*
(Continued)

Primary Examiner — Alan B Waits
(74) Attorney, Agent, or Firm — Westerman, Hattori, Daniels & Adrian

(57) ABSTRACT

A motion guide device is formed of: a track member including a base portion extending along a longitudinal direction, and a pair of wall portions erected from both edges of the base portion in a width direction, and having rolling element rolling grooves formed along a longitudinal direction; and a moving member which is assembled in a movable manner along the longitudinal direction between the wall portions, and to which a pair of guide members are assembled, load rolling element rolling grooves which correspond to the rolling element rolling grooves being formed in the guide members, wherein at least either one of the guide members is equipped with a biasing member on a surface of the guide member on a side opposite to a surface (Continued)

of the guide member on which the load rolling element rolling groove is formed.

4 Claims, 5 Drawing Sheets

(51) Int. Cl.
*F16C 29/12* (2006.01)
*F16C 29/06* (2006.01)

(52) U.S. Cl.
CPC .......... *F16C 29/04* (2013.01); *F16C 29/0602* (2013.01); *F16C 29/063* (2013.01); *F16C 29/123* (2013.01)

(58) Field of Classification Search
CPC ...... F16C 29/063; F16C 29/12; F16C 29/123; F16C 29/001; F16C 29/002
See application file for complete search history.

(56) References Cited

U.S. PATENT DOCUMENTS

| | | | | |
|---|---|---|---|---|
| 3,398,999 | A * | 8/1968 | Halvorsen | F16C 29/005 384/45 |
| 3,608,985 | A * | 9/1971 | Swanson | F16C 29/008 384/44 |
| 7,798,719 | B2 | 9/2010 | Michioka et al. | |
| 2001/0022868 | A1 * | 9/2001 | Teramach | F16C 29/008 384/45 |
| 2004/0184684 | A1 * | 9/2004 | Shiba | B23Q 1/28 384/7 |

FOREIGN PATENT DOCUMENTS

| | | |
|---|---|---|
| JP | 2006-112458 A | 4/2006 |
| JP | 4531053 B2 | 8/2010 |
| JP | 2012-528284 A | 11/2012 |
| JP | 2013-145037 A | 7/2013 |
| WO | 2006/028142 A1 | 3/2006 |

OTHER PUBLICATIONS

International Search Report dated Dec. 6, 2016, issued in counterpart International Application No. PCT/JP2016/076588 (1 page).
Notification of Reasons for Refusal dated Apr. 25, 2017, issued in counterpart Japanese application No. 2015-199636, with English translation (6 pages).
Decision to Grant a Patent dated Jul. 4, 2017, issued in counterpart Japanese application No. 2015-199636, with English translation (6 pages).
Office Action dated Aug. 14, 2018, issued in counterpart Korean Application No. 10-2018-7008795, with English translation (7 pages).

* cited by examiner

MOTION GUIDE DEVICE

TECHNICAL FIELD

The present invention relates to a motion guide device, and more particularly to a motion guide device where a weight of the entire motion guide device can be reduced without largely lowering a basic performance of the motion guide device and, at the same time, manufacturing steps are simplified thus facilitating the manufacture of the motion guide device.

BACKGROUND ART

Conventionally, there has been known a motion guide device, as an actuator, which includes a track member, a moving member, and a screw shaft. The track member includes: a base portion extending along the longitudinal direction; and a pair of wall portions which are erected from both edges of the base portion in the width direction, and on which rolling element rolling grooves are famed along the longitudinal direction. The moving member is assembled in a movable manner along the longitudinal direction between the wall portions, and load rolling element rolling grooves which correspond to the rolling element rolling grooves are formed on the moving member. The screw shaft is inserted into a through hole famed in the moving member, and a helical rolling element rolling groove for screw is formed on the screw shaft.

In the motion guide device having such a configuration, main members such as the track member, the moving member and the screw shaft are made of a steel material so as to ensure rigidity. However, when these members are made of a steel material, the motion guide device increases in weight. To increase a driving speed for reducing a cycle time, it is necessary to reduce a weight of the motion guide device as much as possible. On the other hand, when the main members such as the track member, the moving member and the screw shaft are made of a material such as aluminum, for example, in order to reduce a weight of the motion guide device, a load from the rolling element cannot be appropriately received and hence, a rating is reduced.

To solve such conflicting problems, there has been known the following. The configuration is adopted where a track member and a moving member are made of metal having light weight such as aluminum and, at the same time, rolling element rolling grooves and load rolling element rolling grooves on which rolling elements roll, a screw shaft and the like are made of a steel material, and members on which these rolling element rolling grooves and load rolling element rolling grooves are famed are assembled to the track member and the moving member. With the adoption of such a configuration, a weight of the motion guide device is reduced without largely reducing a rating of the motion guide device.

However, when the track member and the moving member are formed of separate members from the rolling element rolling grooves and the load rolling element rolling grooves, it is difficult to perform a positioning adjustment in assembling the rolling element rolling groove and the load rolling element rolling groove to the track member and the moving member. Accordingly, a complicated operation is required so as to adjust a gap formed between the rolling element rolling groove and the load rolling element rolling groove to have a fixed amount.

Further, when the rolling element rolling groove and the load rolling element rolling groove are formed of separate members, the respective members have a tolerance and hence, a gap amount differs for the respective motion guide devices. Accordingly, a ball adjustment step is required where an appropriate rolling element which corresponds to the gap, formed between the rolling element rolling groove and the load rolling element rolling groove, is selected from rolling elements having different diameters. Such a ball adjustment step is an extremely complicated step where a ball having an optimum diameter is selected from a large number of balls thus increasing cost. For this reason, there has been a demand for eliminating the ball adjustment step so as to reduce manufacturing cost.

In such a structure where each rolling element rolling groove is adhered to the track member, as in the case of the linear guide device described in following Patent Literature 1, a rail member is adhered to a rail housing by way of an elastic member thus performing a positioning of the rail member.

CITATION LIST

Patent Literature

Patent Literature 1: Japanese Patent No. 4531053

DISCLOSURE OF THE INVENTION

Problems to be Solved by the Invention

However, in the linear guide device described in Patent Literature 1, with such a structure, the rail member can be easily positioned. However, after the positioning of the rail member, since the rail member is assembled to the rail housing only by an adhesive force of an adhesive agent, in addition to that it takes time before the adhesive agent is cured, it is still necessary to include a ball adjustment step where a ball having an optimal diameter is selected.

The present invention has been made to solve the above-mentioned case, and it is an object of the present invention to provide a motion guide device where a track member and a moving member are famed of separate members from a rolling element rolling groove and a load rolling element rolling groove thus allowing the motion guide device to be manufactured at low cost and, at the same time, a gap formed between the rolling element rolling groove and the load rolling element rolling groove can be easily adjusted to an appropriate amount in assembling the rolling element rolling groove and the load rolling element rolling groove to the track member and the moving member.

Means for Solving the Problems

A motion guide device according to the present invention is a motion guide device which includes: a track member including a base portion extending along a longitudinal direction, and a pair of wall portions erected from both edges of the base portion in a width direction, and having rolling element rolling grooves formed along a longitudinal direction; and a moving member which is assembled in a movable manner along the longitudinal direction between the wall portions, and to which a pair of guide members are assembled, load rolling element rolling grooves which correspond to the rolling element rolling grooves being formed in the guide members, wherein at least either one of the guide members is equipped with a biasing member on a surface of the guide member on a side opposite to a surface of the guide member on which the load rolling element rolling groove is formed.

Effects of the Invention

According to the present invention, at least either one of the guide members, mounted on the moving member, is equipped with a biasing member on a surface of the guide member on the side opposite to a surface of the guide member on which the load rolling element rolling groove is formed. Accordingly, by automatically adjusting the position of the guide member by a reaction force of the biasing member, a gap formed between the rolling element rolling groove and the load rolling element rolling groove can be adjusted and hence, assemblability of the motion guide device is largely improved. The ball adjustment step is eliminated so that cost can be reduced. Further, with the elimination of the ball adjustment step, it becomes unnecessary to prepare balls of plural tolerances so that management of balls becomes unnecessary thus further reducing manufacturing cost.

MODE FOR CARRYING OUT THE INVENTION

Hereinafter, an embodiment of a motion guide device according to the present invention is described with reference to drawings. The embodiment described hereinafter does not limit the invention according to respective claims. Further, it is not necessarily the case that all combinations of features described in the embodiment are indispensable as a solving means of the invention.

Figure 1:
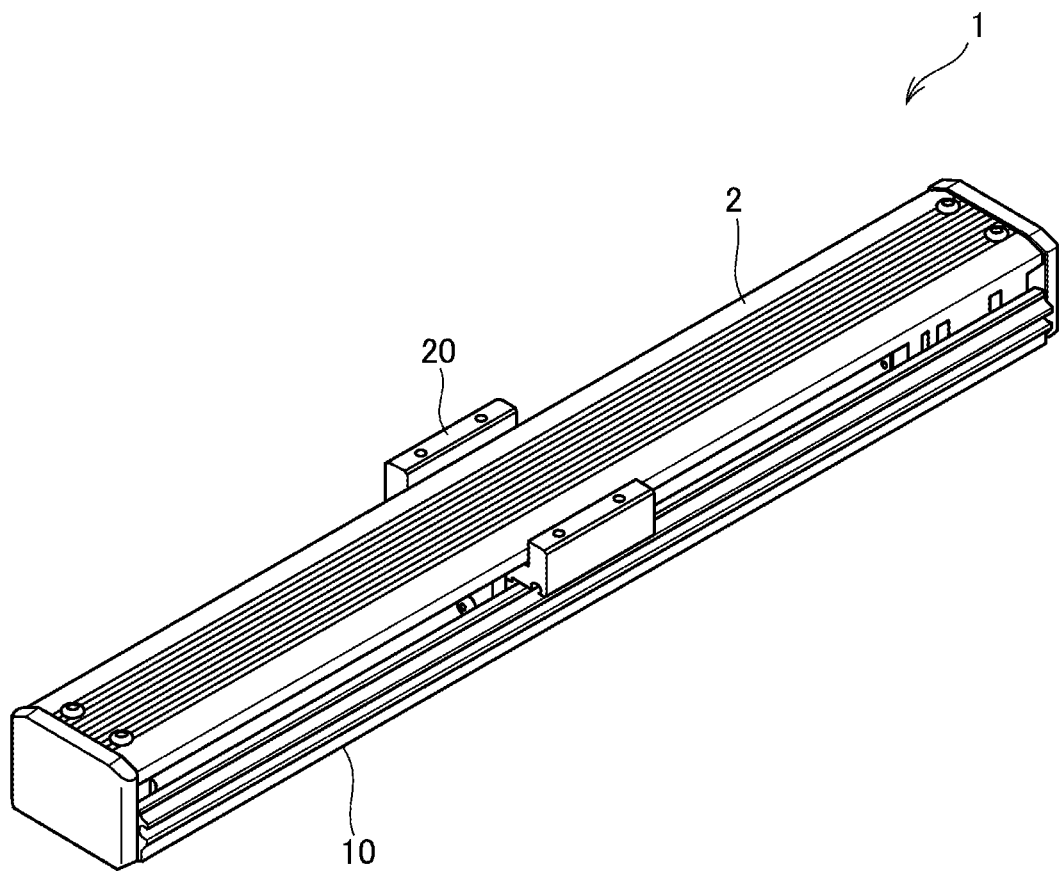
FIG. 1 is a perspective view of a motion guide device according to an embodiment of the present invention.
Figure 2:
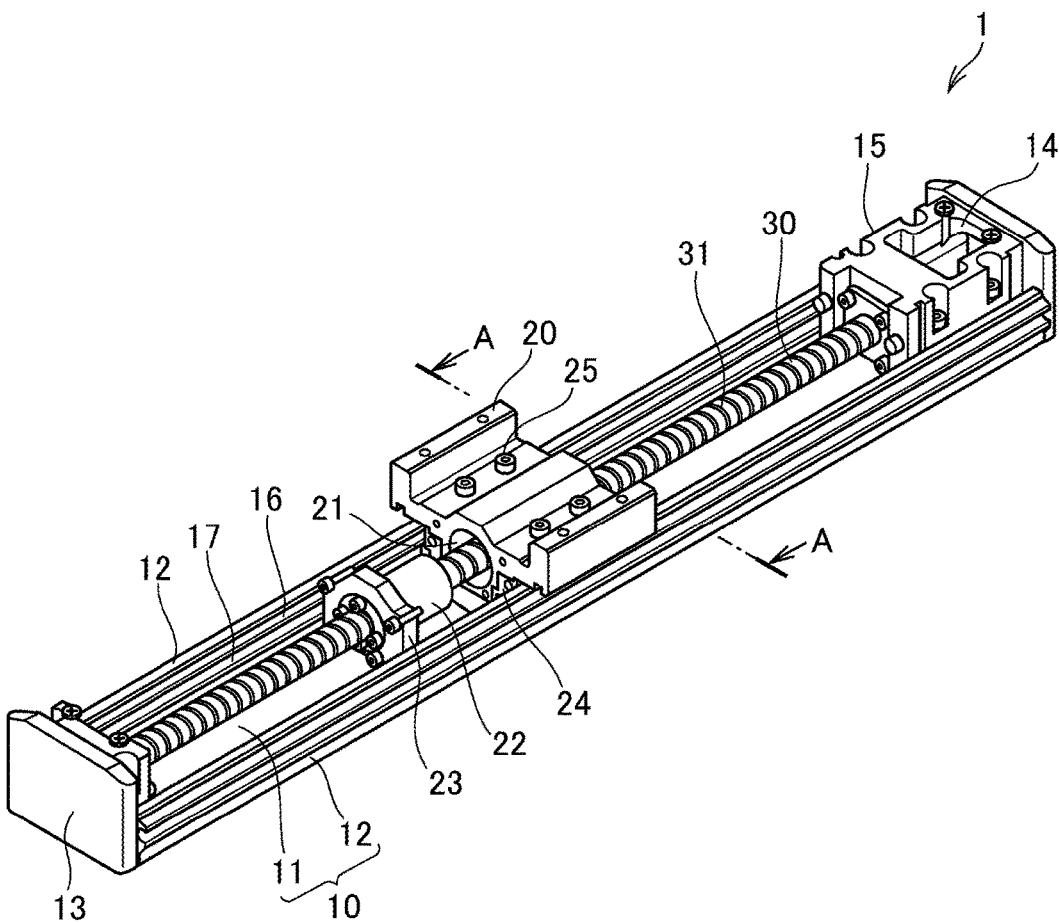
FIG. 2 is an exploded view of the motion guide device according to the embodiment of the present invention.
Figure 3:
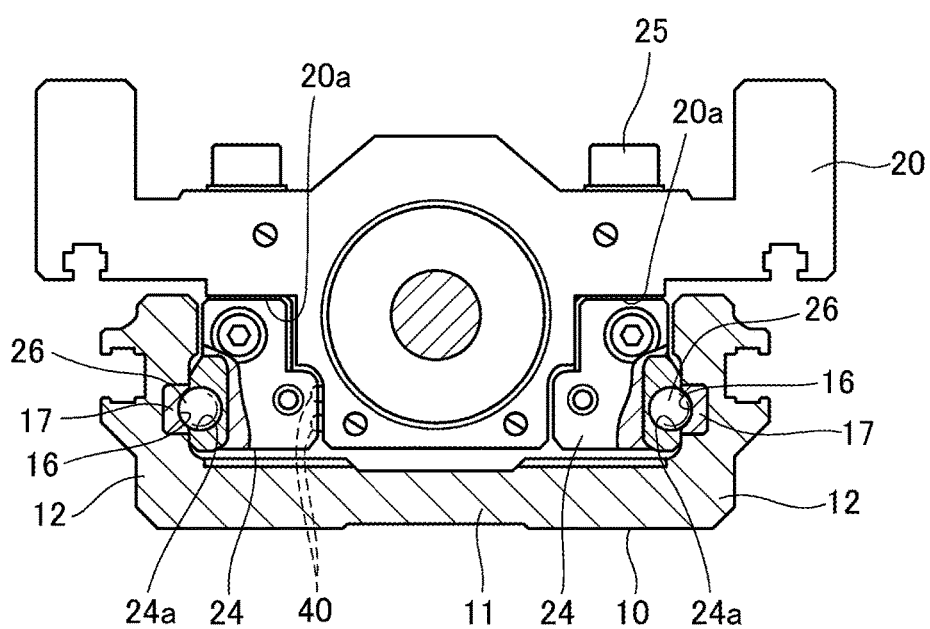
FIG. 3 is a cross-sectional view taken along line A-A in FIG. 2.
Figure 4:
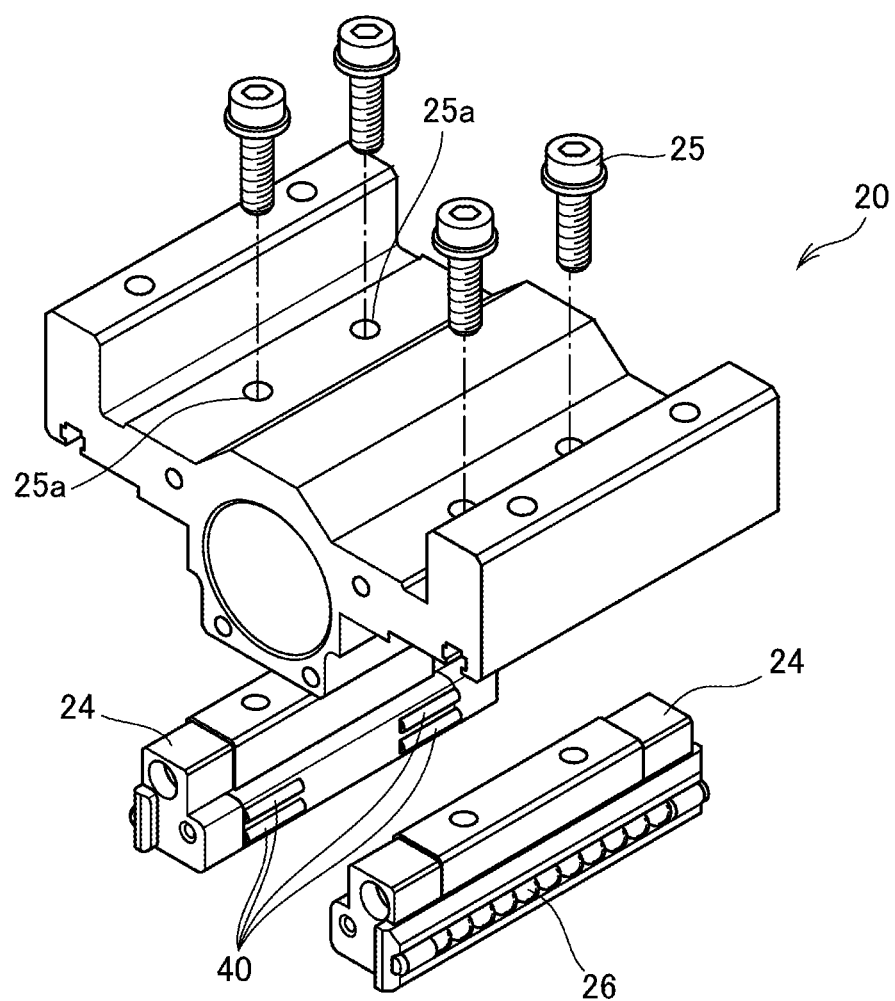
FIG. 4 is an exploded view for describing the configuration of a moving member used in the motion guide device according to the embodiment of the present invention.
Figure 5:
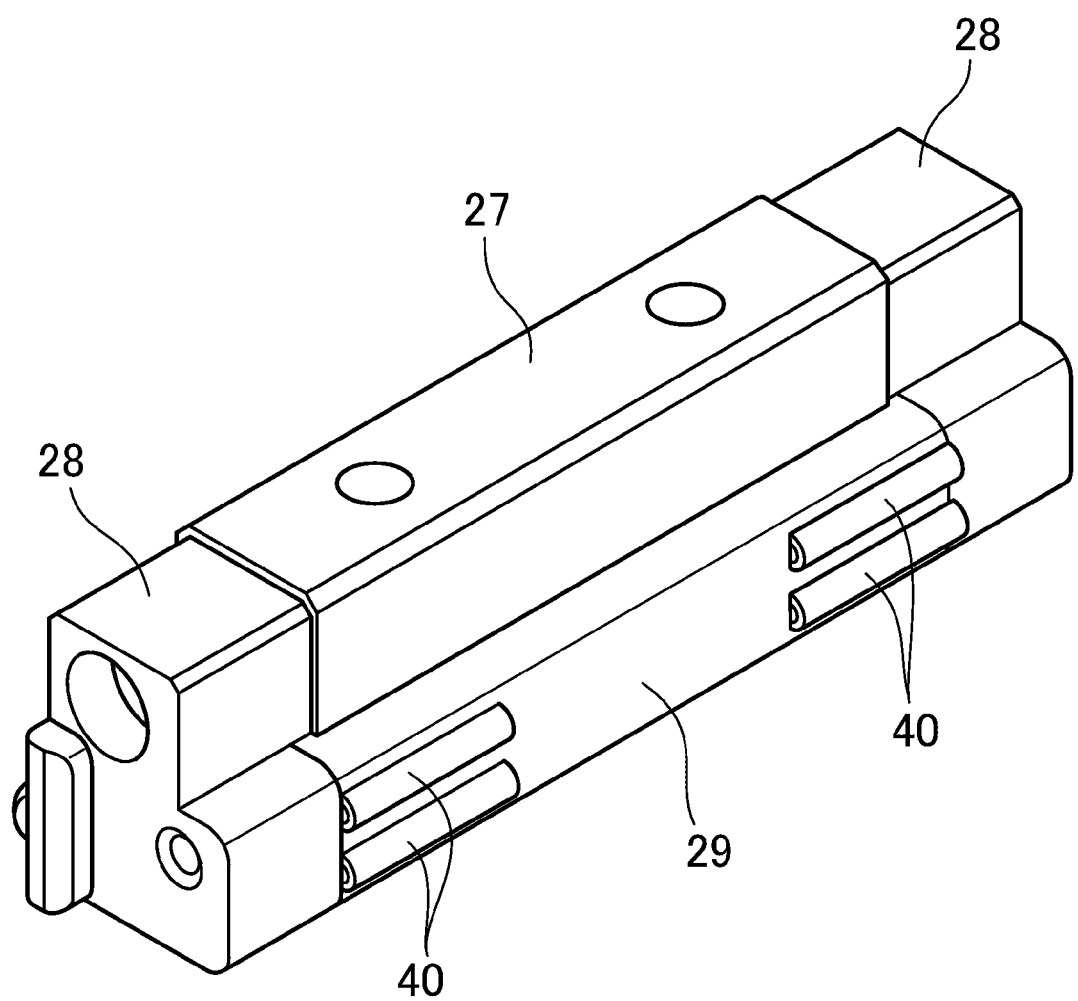
FIG. 5 is a perspective view showing a back surface of the guide member used in the motion guide device according to the embodiment of the present invention.
Figure 6:
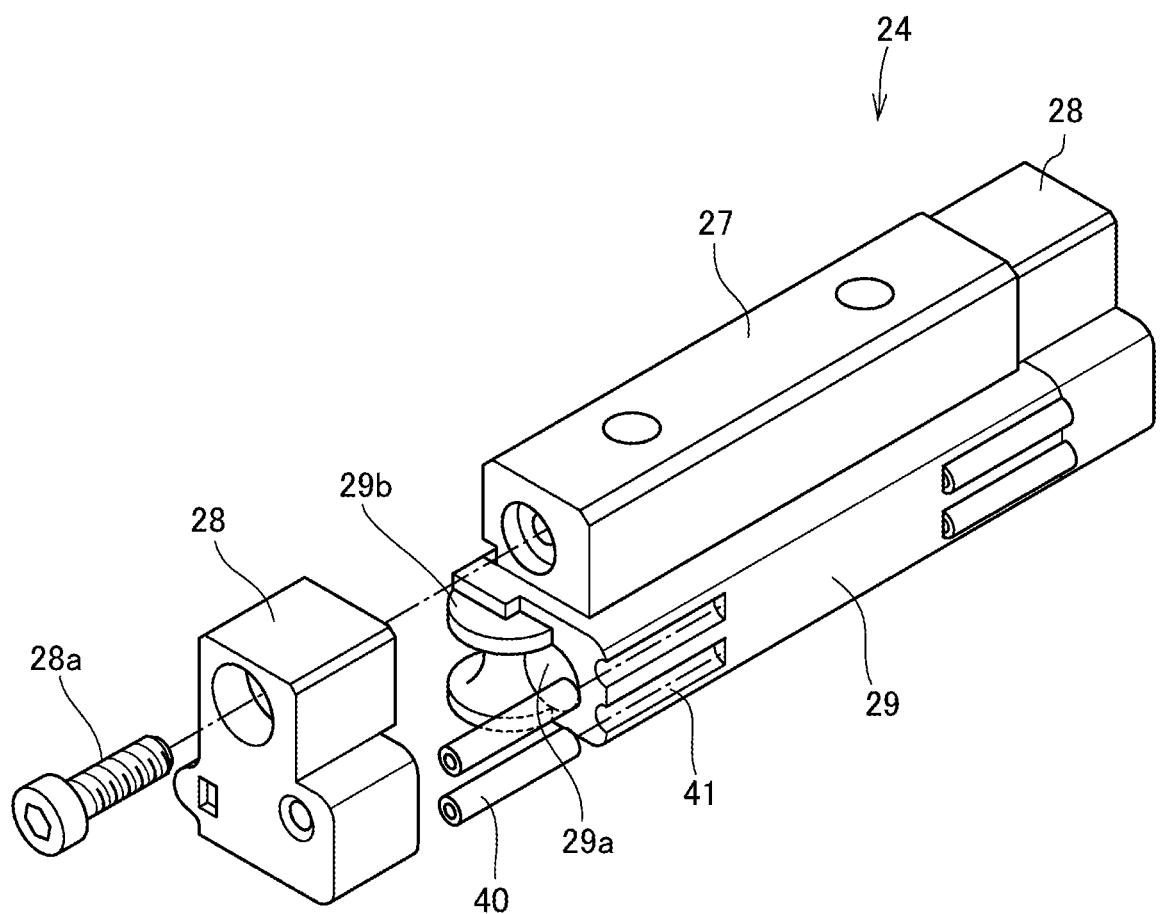
FIG. 6 is an exploded view of the guide member used in the motion guide device according to the embodiment of the present invention.

FIG. 1 is a perspective view of the motion guide device according to the embodiment of the present invention. FIG. 2 is an exploded view of the motion guide device according to the embodiment of the present invention. FIG. 3 is a cross-sectional view taken along line A-A in FIG. 2. FIG. 4 is an exploded view for describing the configuration of a moving member used in the motion guide device according to the embodiment of the present invention. FIG. 5 is a perspective view showing a back surface of the guide member used in the motion guide device according to the embodiment of the present invention. FIG. 6 is an exploded view of the guide member used in the motion guide device according to the embodiment of the present invention.

As shown in FIG. 1, the motion guide device 1 according to this embodiment includes a track member 10 extending along the longitudinal direction, and a moving member 20 assembled to the track member 10 in a movable manner in the longitudinal direction along the track member 10. A cover 2 is mounted on an upper surface of the track member 10 thus preventing a foreign object from entering the motion guide device 1. The moving member 20 extends to the outside from gaps formed between the track member 10 and the cover 2, and the moving member 20 is mounted on a guide target.

As shown in FIG. 2, the track member 10 includes a base portion 11 extending along the longitudinal direction, and a pair of wall portions 12, 12 erected from both edges of the base portion 11 in the width direction. Rolling groove forming members 17, 17 are respectively mounted on opposing surfaces of the wall portions 12 along the longitudinal direction. Rolling element rolling grooves 16, 16, extending along the longitudinal direction, are famed on the rolling groove forming members 17, 17.

A drive member mounting portion 15 is formed at one end of the track member 10 in the longitudinal direction. A drive member 14 is mounted on the drive member mounting portion 15, and the drive member mounting portion 15 rotatably holds a screw shaft 30 to which a rotational force is applied by the drive member 14. An end wall 13 is famed at the other end of the track member 10 in the longitudinal direction, and the end wall 13 rotatably holds the screw shaft 30 described later. An electric motor or the like is preferably used as the drive member 14. The rolling groove forming members 17 are preferably made of hard metal such as a steel material, and the track member 10 is preferably made of a material having a lighter weight than a steel material, for example, an aluminum alloy.

The moving member 20 is assembled such that the moving member 20 is movable along the longitudinal direction between the wall portions 12, 12 famed on the track member 10. A through hole 21 is formed in the moving member 20, and the screw shaft 30 rotatably assembled to the track member 10 is inserted into the through hole 21. A nut member 22 screwed with the screw shaft 30 is assembled to the through hole 21 by way of a flange portion 23.

As shown in FIG. 3, the moving member 20 includes guide members 24 assembled such that rolling elements 26 circulate endlessly. The rolling elements 26 roll through the rolling element rolling grooves 16 formed on the rolling groove forming members 17 assembled to the track member 10. One pair of guide members 24 are mounted on the moving member 20 in a spaced apart manner in the width direction so as to correspond to the wall portions 12, 12. The guide members 24 are fixed to mounting surfaces 20a formed on the moving member 20. Further, one guide member 24 is mounted on the moving member 20 by way of biasing members 40.

Each biasing member 40 is preferably formed of an elastic member such as a rubber tube and, more preferably, famed of a hollow rubber tube as shown in FIG. 6. The biasing members 40 bias the guide member 24 toward the wall portion 12 by an elastic force. The biasing force is adjusted such that a gap formed between the rolling element rolling groove 16 and a load rolling element rolling groove 24a becomes an appropriate gap corresponding to a diameter of the rolling elements 26 rolling through the gap formed between these grooves. Accordingly, the adjustment of the gap is facilitated.

Each guide member 24 is fixed by fastening means 25 such as bolts from the direction intersecting with the direction along which the biasing members 40 of the moving member 20 bias the guide member 24 (for example, from an upper surface of the moving member 20). As described above, the guide member 24 is fixed to the moving member 20 by the fastening means 25 from the direction intersecting with the direction along which the biasing members 40 bias the guide member 24. Accordingly, the guide members 24 can be fixed in a state where a fastening force of the fastening means 25 does not influence a biasing force of the biasing members 40, and the guide members 24 are positioned by the above-mentioned biasing members 40. The guide members 24 are assembled in a movable manner in the width direction along the mounting surfaces 20a until the guide members 24 are fixed to the mounting surfaces 20a by the fastening means 25. With such a configuration, the positioning of the guide members 24 can be easily performed by a biasing force of the biasing members 40.

As shown in FIG. 3 and FIG. 4, one pair of upper biasing members 40 and one pair of lower biasing members 40 are preferably mounted on both end sides of the guide member 24 in the longitudinal direction, that is, four biasing members 40 are preferably mounted on the guide member 24 in total. It is preferable to arrange the biasing members 40 such that a distance to the upper biasing member 40 from the load rolling element rolling groove 24a and a distance to the lower biasing member 40 from the load rolling element rolling groove 24a become substantially equal to each other in cross section orthogonal to the longitudinal direction.

Further, fastening holes 25a are formed in the moving member 20 so as to fix the guide member 24, on which the biasing members 40 are mounted, to the moving member 20. Each fastening hole 25a is formed with an elongated hole or a larger diameter than a bolt. The fastening hole 25a is formed with an adjustment tolerance so as to allow fastening of the guide member 24 even when the position of the guide member 24 is adjusted by the biasing members 40.

As shown in FIG. 5 and FIG. 6, the guide member 24 includes a guide member body 27 and an endless circulation forming member 29. The load rolling element rolling groove 24a is famed on the guide member body 27 along the longitudinal direction. A direction changing groove 29b, which is continuously formed with the load rolling element rolling groove 24a, and a rolling element return passage 29a, which is continuously formed with the direction changing groove 29b, are famed on the endless circulation forming member 29. Further, end portion members 28 are mounted on both ends of the guide member 24 by mounting means 28a. The end portion member 28 covers the direction changing groove 29b of the endless circulation forming member 29 thus defining a direction changing passage. Further, as shown in FIG. 6, mounting grooves 41 are formed on a surface of the endless circulation forming member 29 on the side opposite to a surface of the endless circulation forming member 29 on which the load rolling element rolling groove 24a is famed. The biasing members 40 are mounted on the mounting grooves 41.

In the guide member 24, when the rolling element 26, which rolls between the rolling element rolling groove 16 and the load rolling element rolling groove 24a, reaches one end of the load rolling element rolling groove 24a, the rolling element 26 passes through the rolling element return passage 29a through the direction changing groove 29b thus being returned to the other end of the load rolling element rolling groove 24a. As described above, the guide member 24 realizes endless circulation of the rolling elements 26. The guide member body 27 is preferably made of hard metal such as a steel material, and the moving member 20 and the endless circulation passage forming member 29 are preferably made of a material having a lighter weight than a steel material, for example, an aluminum alloy or the like. Further, the end portion members 28 mounted on the end portions of the guide member 24 may be made of a synthetic resin.

As shown in FIG. 2, the screw shaft 30 and the nut 22 forms a ball screw device. In the ball screw device, a helical rolling element rolling groove for screw 31 is formed on an outer peripheral surface of the screw shaft 30 with a predetermined lead and, at the same time, the screw shaft 30 is famed so as to extend along the axial direction. The nut 22 has a through hole through which the screw shaft 30 passes, and which has a circular cylindrical shape and, at the same time, a load rolling element rolling groove for screw, which opposedly faces the rolling element rolling groove for screw 31 famed on the screw shaft 30, is famed on an inner peripheral surface of the through hole. The screw shaft 30 and the nut 22 are screwed with each other with a plurality of rolling elements for ball screw arranged between the rolling element rolling groove for screw 31 and the load rolling element rolling groove for screw. The nut 22 is not limited to have a circular cylindrical shape. For example, the nut 22 may be famed into a cylindrical shape having a rectangular outer shape or the like in cross section orthogonal to the axial direction.

In the ball screw device having such a configuration, the nut 22 moves along the axial direction of the screw shaft 30 due to relative rotation between the screw shaft 30 and the nut 22. In the motion guide device 1 according to this embodiment, a rotational motion of the screw shaft 30 rotated due to the rotation of the drive member 14 is converted into a linear motion of the nut 22. The screw shaft 30 and the nut 22 are preferably made of hard metal such as a steel material, and the flange portion 23 is preferably made of a material having a lighter weight than a steel material, for example, an aluminum alloy or the like.

As described above, in the motion guide device 1 according to this embodiment, at least either one of the guide members 24 mounted on the moving member 20 is assembled to the mounting surface 20a famed on the moving member 20. The guide member 24 is equipped with the biasing members 40 on the surface thereof on the side opposite to the surface on which the load rolling element rolling groove 24a is formed, and the biasing members 40 bias the guide member 24 toward the wall portion 12. The guide member 24 is fixed by fastening from the direction intersecting with the biasing direction. Accordingly, a gap formed between the rolling element rolling groove 16 and the load rolling element rolling groove 24a can be automatically adjusted. After the adjustment of the gap is performed, the position of the guide member 24 is fixed by fixing the guide member 24 by fastening from the upper surface of the moving member 20 and hence, the gap can be easily adjusted. Therefore, a complicated step such as a ball adjustment step can be eliminated and hence, a manufacturing cost can be reduced.

In the motion guide device 1 according to this embodiment, at least one pair of biasing members 40 are respectively assembled to both ends of the guide member 24 in the longitudinal direction, for example, four biasing members 40 are assembled to the guide member 24 in total. Accordingly, the guide member 24 is biased from both ends of the guide member 24 and hence, a biasing force can be more effectively transmitted to the guide member 24. Therefore, the gap famed between the rolling element rolling groove 16 and the load rolling element rolling groove 24a can be automatically adjusted with higher accuracy.

Further, in the motion guide device 1 according to this embodiment, the biasing members 40 are is preferably configured such that, in cross section orthogonal to the longitudinal direction, distances from the load rolling element rolling groove 24a to the mounting grooves 41 on which the biasing members 40 are mounted are substantially equal to each other. To be more specific, it is preferable that the pair of mounting grooves 41, 41 be arranged at positions equidistantly spaced apart in the vertical direction from an arbitrary point positioned on the extension in the horizontal direction from a center point of the load rolling element rolling groove 24a in the groove width direction. With such a configuration, a biasing force of the biasing members 40 can be appropriately transmitted to the guide member 24. Accordingly, the gap famed between the rolling element rolling groove 16 and the load rolling element rolling groove 24a can be automatically adjusted with higher accuracy.

The motion guide device 1 according to this embodiment is formed of a hollow elastic member. Accordingly, a biasing force can be lowered compared to a case where a motion guide device is famed of a solid elastic member thus preventing the application of an excessively large biasing force. Therefore, the gap formed between the rolling element rolling groove 16 and the load rolling element rolling groove 24a can be automatically adjusted more smoothly.

In the motion guide device 1 according to this embodiment, the rolling groove forming members 17 are mounted on the wall portions 12, and the rolling element rolling grooves 16 are formed on the rolling groove forming members 17. At least the guide members 24, the rolling groove forming members 17 and the screw shaft 30 are made of a steel material. The track member 10 and the moving member 20 are made of a material having a lighter weight than a steel material. Accordingly, a rated load can be secured and, at the same time, a weight of the motion guide device 1 can be reduced.

The present invention is not limited to the above-mentioned embodiment, and various modifications are conceivable without departing from the gist of the present invention. For example, the description has been made with respect to the case where the biasing members 40 are famed of elastic members or the like, and are interposed between the moving member 20 and the guide member 24. However, it may be possible to adopt the configuration where the biasing members 40 are famed of wedge members each having an inclined surface, and the wedge members are fastened by the fastening means 25. With such a configuration, the position of the guide member 24 can be adjusted conforming to the inclined surfaces. Accordingly, the position of the guide member 24 can be freely adjusted by adjusting a fastening amount of the fastening means 25.

A motion guide device may be formed of the track member 10 and the moving member 20 without providing a ball screw device to the motion guide device. It is apparent from the description of Claims that such modes to which modification or improvement is applied also fall within the technical scope of the present invention.

REFERENCE NUMERALS

1: motion guide device, 10: track member, 11: base portion, 12: wall portion, 16: rolling element rolling groove, 17: rolling groove forming member, 20: moving member, 24: guide member, 24a: load rolling element rolling groove, 25: fastening means, 30: screw shaft, 40: biasing member

The invention claimed is:

1. A motion guide device comprising:
a raceway member including
a base portion extending along a longitudinal direction, and
a pair of wall portions erected from both edges of the base portion in a width direction, and having rolling element rolling grooves formed along a longitudinal direction; and
a moving member which is assembled in a movable manner along the longitudinal direction between the wall portions, and to which a pair of guide members are assembled, load rolling element rolling grooves which correspond to the rolling element rolling grooves being formed in the guide members, wherein
a first of the guide members is equipped with an elastic member on a surface of the guide member on a side opposite to a surface of the guide member on which the load rolling element rolling groove is formed to allow the position of the guide member to be adjusted automatically by a reaction force of the elastic member such that a gap formed between the rolling element rolling groove and the load rolling element rolling groove is adjusted to an appropriate gap corresponding to a diameter of rolling elements rolling through the gap formed between the rolling element rolling groove and the load rolling element rolling groove, and is formed with a screw portion along a direction intersecting with a direction along which the elastic member biases the first guide member,
the moving member is formed with:
a mounting surface that guides the guide member in the direction along which the elastic member biases in a movable manner along the width direction automatically and allows the first guide member to be fixed to the moving member; and
a through hole formed along a direction intersecting with a direction along which the elastic member biases the guide member,
the first guide member is fastened and fixed from an upper surface of the moving member by a bolt that is inserted into the through hole and fastened to the screw portion to allow the guide member to be fixed in a state where a fastening force of the bolt does not influence a biasing force of the elastic member, and the guide member is positioned by the elastic member,
the through hole, for fixing the first guide member that is equipped with the elastic member to the moving member, is formed with an elongated hole shape or with a larger diameter than the bolt so as to have an adjustment tolerance that is sufficient to allow fastening of the guide member when the position of the guide member is adjusted by the elastic member.

2. The motion guide device according to claim 1, wherein the elastic member is mounted on both ends of the first guide member in the longitudinal direction.

3. The motion guide device according to claim 1, wherein a pair of the elastic members are mounted on the first guide member in cross section orthogonal to the longitudinal direction.

4. The motion guide device according to claim 2, wherein a pair of the elastic members are mounted on the first guide member in cross section orthogonal to the longitudinal direction.

* * * * *